US007850874B2

(12) United States Patent
Lu et al.

(10) Patent No.: US 7,850,874 B2
(45) Date of Patent: Dec. 14, 2010

(54) METHODS AND DEVICES FOR ELECTROPHORETIC DEPOSITION OF A UNIFORM CARBON NANOTUBE COMPOSITE FILM

(75) Inventors: Mei Lu, Cary, NC (US); Jie Liu, Chapel Hill, NC (US); Huaizhi Geng, Cary, NC (US); Bo Gao, Elon, NC (US)

(73) Assignee: Xintek, Inc., Research Triangle Park, NC (US)

( * ) Notice: Subject to any disclaimer, the term of this patent is extended or adjusted under 35 U.S.C. 154(b) by 124 days.

(21) Appl. No.: 11/903,194

(22) Filed: Sep. 20, 2007

(65) Prior Publication Data
US 2009/0078914 A1 Mar. 26, 2009

(51) Int. Cl.
*H01B 1/24* (2006.01)
(52) U.S. Cl. .................. 252/510; 252/511; 252/502; 977/742; 977/745; 977/748; 977/746; 977/749
(58) Field of Classification Search ................ 252/510, 252/511, 502; 977/742, 745, 748, 746, 749
See application file for complete search history.

(56) References Cited

U.S. PATENT DOCUMENTS

| 6,280,697 | B1 * | 8/2001 | Zhou et al. ............... 423/414 |
| 6,436,221 | B1 * | 8/2002 | Chang et al. ............. 156/247 |
| 6,553,096 | B1 * | 4/2003 | Zhou et al. ............... 378/122 |
| 6,630,772 | B1 | 10/2003 | Bower et al. |
| 6,616,497 | B1 | 12/2003 | Choi et al. |
| 6,683,783 | B1 * | 1/2004 | Smalley et al. ........... 361/502 |
| 6,693,055 | B2 | 2/2004 | Yoon et al. |
| 6,835,366 | B1 * | 12/2004 | Margrave et al. ........ 423/447.1 |
| 6,896,864 | B2 * | 5/2005 | Clarke ..................... 423/447.1 |
| 6,902,658 | B2 | 6/2005 | Talin et al. |
| 6,969,690 | B2 * | 11/2005 | Zhou et al. ............... 438/787 |
| 7,250,477 | B2 * | 7/2007 | Guo et al. ................. 525/391 |
| 7,252,749 | B2 | 8/2007 | Zhou et al. |
| 7,294,248 | B2 | 11/2007 | Gao |
| 2004/0055892 | A1 | 3/2004 | Oh et al. |
| 2004/0122153 | A1 * | 6/2004 | Guo et al. ................. 524/430 |
| 2004/0256975 | A1 | 12/2004 | Gao et al. |
| 2006/0052509 | A1 * | 3/2006 | Saitoh ..................... 524/496 |
| 2006/0055303 | A1 | 3/2006 | Liu et al. |
| 2006/0155376 | A1 * | 7/2006 | Asgari ..................... 623/16.11 |
| 2008/0107586 | A1 * | 5/2008 | Smalley et al. ........... 423/447.3 |
| 2008/0194736 | A1 * | 8/2008 | Lu .......................... 524/35 |
| 2008/0281014 | A1 * | 11/2008 | Momose et al. ........... 522/71 |
| 2009/0291352 | A1 * | 11/2009 | Oshihara et al. .......... 429/42 |
| 2009/0308753 | A1 * | 12/2009 | Wong et al. .............. 205/50 |
| 2009/0321688 | A1 * | 12/2009 | Saitoh ..................... 252/511 |

FOREIGN PATENT DOCUMENTS

| CN | 1994876 A | * | 7/2007 |
| WO | WO 2006040398 A1 | * | 4/2006 |

OTHER PUBLICATIONS

English translation of CN 1994876, Jul. 11, 2007.*
Bower et al., "Plasma-induced alignment of carbon nanotubes", Applied Physics Letters, 77 (6), 830-832 (Aug. 7, 2000).*
Journet et al., "Large-scalle production of single-walled carbon nanotubes by the electric-arc technique", Nature, 388, 756-758 (Aug. 21, 1997).*
Burgin et al., "Investigation into the Mechanism of Adsorption of Carbon Nanotubes onto Aminopropylsiloxane Functionalized Surface," Langmuir, 2005, 21, pp. 6596-6602.
Liu et al., "Controlled Deposition of Individual Single-Walled Carbon Nanotubes on Chemically Functionalized Templates," Chem. Phys. Lett., 1999, 303, pp. 125-129.
Burghard et al., "Controlled Adsorption of Carbon Nanotubes on Chemically Modified Electrode Arrays," Adv. Mater., 1998, 10, pp. 584-588.
Krupke et al., "Patterning and Visualizing Self-Assembled Monolayers with Low-Energy Electrons," Nano Lett., 2002, 2, pp. 1161-1164.
Fu et al., "Selective Coating of Single Wall Carbon Nanotubes with Thin SiO2 Layer," Nano Lett., 2002, 2, pp. 329-332.
Lewenstein et al., "High-Yield Selective Placement of Carbon Nanotubes on Pre-patterned Electrodes," Nano Lett., 2002, 2, pp. 443-446.
Luong et al., "Solubilization of Multiwall Carbon Nanotubes by 3-Aminopropyltriethoxysilane Towards the Fabrication of Electrochemical Biosensors with Promoted Electron Transfer," Electroanalysis, 2004, 16, pp. 132-138.
Wang et al., "Noncovalent Functionalization of Multiwalled Carbon Nanotubes: Application in Hybrid Nanostructures," J. Phys. Chem. B, 2006, 110, 6631-6636.

* cited by examiner

*Primary Examiner*—Douglas Mc Ginty
(74) *Attorney, Agent, or Firm*—Jenkins, Wilson, Taylor & Hunt, P.A.

(57) ABSTRACT

Methods and devices are provided relating to the homogeneous deposition of a composite film of carbon nanotubes by electrophoresis. The methods comprise linking carbon nanotubes to matrix particles prior to electrophoretic deposition. The methods improve the adhesion of the composite film to the substrate and reduce the surface roughness. Carbon nanotube films and electron field emission cathodes fabricated by this process demonstrate enhanced electron field emission characteristics.

37 Claims, 8 Drawing Sheets

METHODS AND DEVICES FOR ELECTROPHORETIC DEPOSITION OF A UNIFORM CARBON NANOTUBE COMPOSITE FILM

TECHNICAL FIELD

The present disclosure relates to the production of carbon nanotube-matrix particle complexes and the electrophoretic deposition of the complexes to form carbon nanotube composite films with improved surface uniformity and adhesion between carbon nanotubes and matrix materials.

BACKGROUND

Nanostructure materials, such as carbon nanotubes (CNT), possess promising properties, such as electron field emission characteristics which appear to be far superior to that of conventional field emitting materials. In particular, CNT materials exhibit low emission threshold fields as well as large emission current densities. Such properties make them attractive for a variety of microelectronic applications, such as lighting elements, field emission flat panel displays, gas discharge tubes for over voltage protection and x-ray generating devices. However, the effective incorporation of such materials into these devices has been hindered by difficulties encountered in the processing of such materials.

Electrophoretic deposition (EPD) is known to be a highly efficient and versatile technique for the deposition of nanostructure materials, including CNT, on a variety of substrates to produce novel coatings and films. An increasing interest in EPD techniques is driven by the availability of a variety of suitable materials, the technique's simplicity and low cost setup, the ability to control deposition, and the potential to scale-up to large dimensions.

The method of EPD can comprise the use of nanostructure materials, matrix materials and a substrate upon which the nanostructure materials are deposited. The matrix material is generally used to enhance the bonding of the nanostructure material with the substrate. For example, nanostructure materials and matrix materials can be co-deposited onto the substrate using EPD to form a composite film. However, composite films produced using this method can have less than desirable characteristics, particularly regarding uniformity of deposition, surface topography and adhesion strength. Thus, there is a need for a method of deposing nanostructure materials and matrix materials to form a composite film with improved surface uniformity, nanostructure material dispersion and adhesion between nanostructure materials and matrix materials.

SUMMARY

It is an object of the presently disclosed subject matter to provide methods and devices related to depositing nanostructure materials onto a substrate to form uniform nanostructure composite films with improved adhesion and emission characteristics.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

DETAILED DESCRIPTION

Following long-standing patent law convention, the terms "a" and "an" mean "one or more" when used in this application, including the claims.

In accordance with the present disclosure, methods of depositing carbon nanotubes (CNT) onto a surface of a substrate are provided. Carbon-nanotubes can be electrophoretically deposited onto a substrate according the present disclosure. The CNT can be linked to a matrix material prior to EPD to provide CNT-matrix particle complexes. In some embodiments, CNT-matrix particle complexes can be formed by dispersing CNT, matrix particles and linker molecules together in a suspension. In some embodiments, CNT-matrix particle complexes can be formed by linking CNT to functionalized matrix particles, wherein the functionalized matrix particles are formed by reacting a linker molecule and a matrix particle.

In accordance with the present disclosure, methods of fabricating CNT-electron field emission cathodes are provided. A CNT-electron field emission cathode according to the present disclosure can include an electron field emission cathode comprising a composite film adhered to a substrate surface. Further, the composite film can comprise an intimate mixture of CNT and matrix materials. The substrate can comprise a conducting surface.

Electrophoretically depositing CNT linked to a matrix material onto a substrate according to the present disclosure provides for improved adhesion of CNT to the substrate. Further, fabricating electron field emission cathodes by electrophoretically depositing CNT-matrix particle complexes provides a smooth and homogenous composite film of CNT and matrix material adhered to the substrate with improved emission characteristics.

Figure 1:
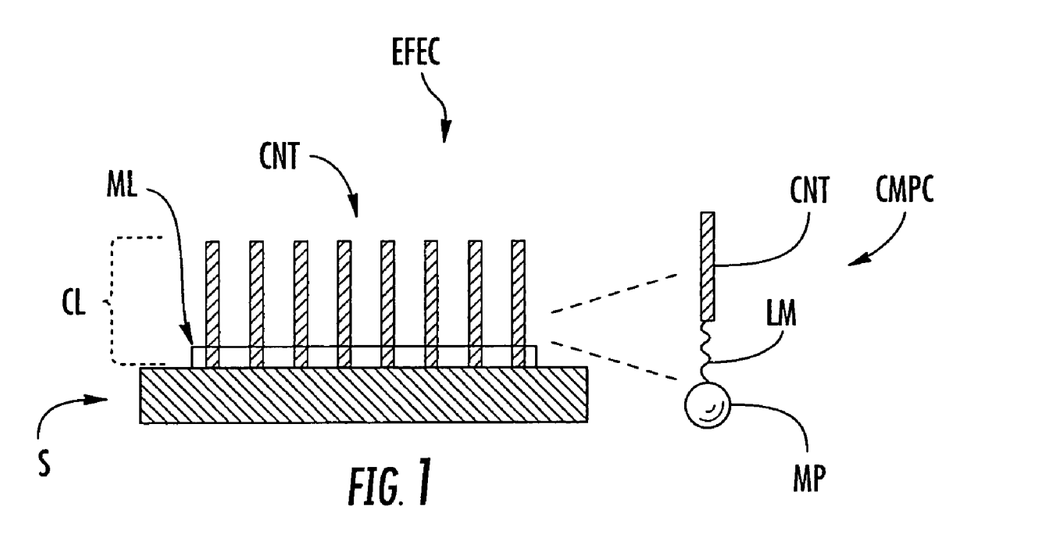
FIG. 1 is a schematic illustration of a carbon nanotube (CNT) electron field emission cathode according to the subject matter disclosed herein.

FIG. 1 illustrates an electron field emission cathode, generally designated EFEC, produced according to the methods of the presently disclosed subject matter. As illustrated in FIG. 1, electron field emission cathode EFEC can comprise composite layer CL adhered to a surface of substrate S. Composite layer CL can further comprise matrix layer ML with one or more carbon nanotube CNT protruding therefrom. The elongated body of protruding CNT can be substantially perpendicular to the surface of substrate S. CNT can be attached to the surface of substrate S as part of a CNT-matrix particle complex, generally designated CMPC. CNT-matrix particle complex CMPC can comprise CNT attached to matrix particle MP via linker molecule LM.

Figure 2A:
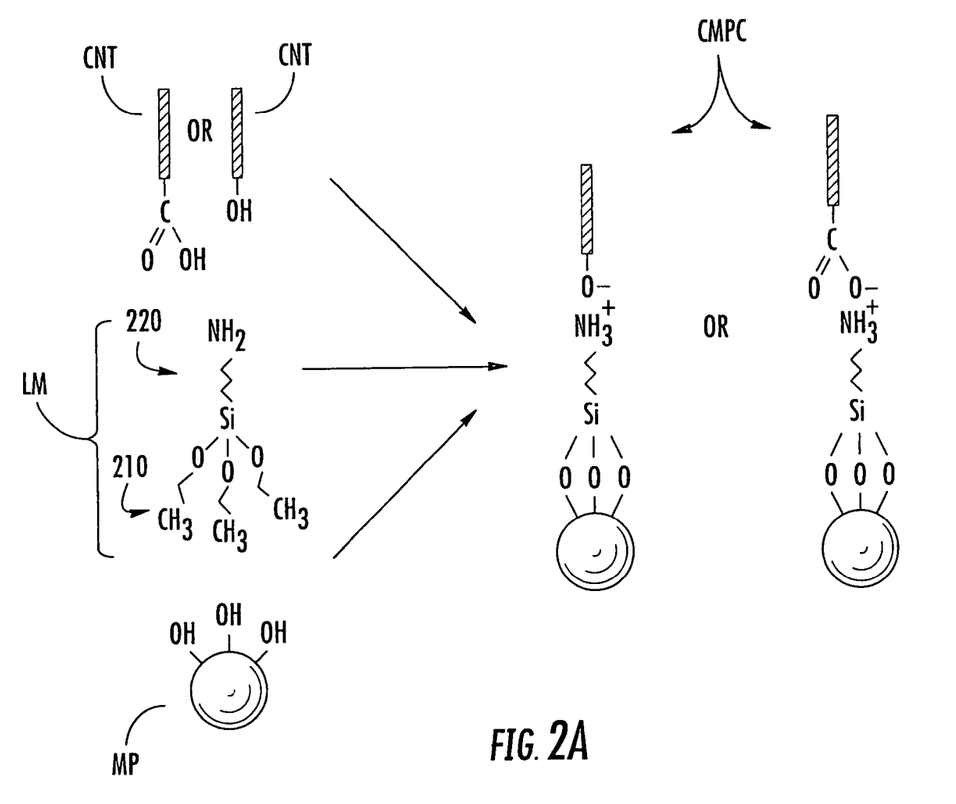
FIG. 2A is a schematic illustration of the formation of CNT-matrix particle complexes using (3-aminopropyl)triethoxysilane (APS) linker molecules to link matrix particles (e.g., glass particles) with CNT.

FIG. 2A illustrates an exemplary method of preparing CNT-matrix particle complexes in accordance with the presently disclosed subject matter. The method can comprise dispersing matrix particle MP, linker molecule LM, and one or more carbon nanotube CNT in a liquid medium, wherein linker molecule LM links CNT to the matrix particle MP to form one or more CNT-matrix particle complex CMPC.

The method illustrated in FIG. 2A provides for the formation of CNT-matrix particle complex CMPC that can subsequently be deposited or adhered to substrate S, as illustrated in FIG. 1. The terms "CNT-matrix particle complex" and "matrix-linked CNT complex" are meant to refer to any complex or structure comprising a matrix particle or material linked to a nanostructure material or particle by way of an appropriate linking molecule, as would be appreciated by one of ordinary skill in the art upon review of the present disclosure.

The terms "matrix particles", "matrix materials" or "adhesion promoting materials" are used interchangeable herein, and are meant to refer to any particle or material that enhances the attachment or adhesion of nanostructure materials to a substrate. As illustrated in FIG. 1, matrix particles MP are provided to enhance the adhesion or binding of CNT to substrate S. As would be appreciated by one of ordinary skill in the art upon reviewing this disclosure, the particles can comprise, but are not limited to, metals, metal oxides, glass, organic binders, and combinations thereof. The particles can comprise any shape and have a diameter of 0.1 microns to 100 microns. In some embodiments the particles can comprise various kinds of organic binders, such as, but not limited to, epoxy resins and starch. Also provided are matrix materials comprising glass particles, which may comprise a variety of oxides, including but not limited to, PbO, $B_2O_3$, $SiO_2$ and $Al_2O_3$. The glass particles can have a diameter ranging from 3 μm to 300 nm, which can be achieved with planetary ball milling of commercially available glass particles.

In addition to CNT, any nanostructure material, nanostructure-containing material or CNT-containing material are provided in accordance with the presently disclosed subject matter. Nanostructure material can be fabricated according to a number of different techniques familiar to those in the art. For example, raw CNT-containing material can be fabricated by laser ablation techniques (see, for example, U.S. Pat. No. 6,280,697), chemical vapor deposition techniques (see, for example, Bower et al., 2000, Appl. Phys. Lett. Vol. 77(6):830-32), or arc-discharge techniques (see, for example, C. Journet et al., 1997, Nature Vol. 388:756).

The term "nanostructure material" is meant to refer to material including nanoparticles such as $C_{60}$ fullerenes, fullerene-type concentric graphitic particles, metal, compound semiconductors such as CdSe, InP, nanowires/nanorods such as Si, Ge, $SiO_x$, $GeO_x$, or nanotubes composed of either single or multiple elements such as carbon, $B_xN_y$, $B_xC_yN_z$, (B=boron, C=carbon, and N=nitrogen), $MoS_2$ and $WS_2$. One of the common features of nanostructure materials is their basic building blocks. A single nanoparticle or a CNT has a dimension that is less than 500 nm in at least one direction. The terms "nanostructure-containing" or "CNT-containing" are intended to encompass materials which are composed entirely, or almost entirely of nanostructure materials or CNT, such as a material composed of nanostructure materials and a minor amount of impurities. The nanostructure-containing material may also include purposefully added materials and/or agents.

Carbon nanotubes can be purified or as formed single wall nanotubes (SWNTs), multi-wall nanotubes (MWNTs), or double wall carbon nanotubes (DWNTs), or mixtures thereof. Carbon nanotubes can be synthesized by laser-ablation, arc-discharge, chemical vapor deposition (CVD), plasma enhanced chemical vapor deposition (PECVD), or other suitable methods. Carbon nanotubes can be 200 nm to 20 microns in length. Carbon nanotubes can have a diameter of 0.4 nm to 100 nm. As-grown CNT may contain a significant amount of impurities, such as amorphous carbon, metal catalyst (Ni, Co, Fe, Mo, Pd, Rh, and Au, etc.), and catalyst supporting materials, which include various kinds of oxides, such as $Al_2O_3$, $SiO_2$, MgO, and CaO.

Also provided within the scope of the presently disclosed subject matter are raw nanostructure materials in the form of nanowires, comprising at least one of the following: elemental metal, Si, Ge, oxide, carbide, nitride, chalcogenide. In addition, the raw nanostructure materials can be in the form of nanoparticles of elemental metal, metal oxide and elemental and compound semiconducting materials.

Raw nanostructure materials can be purified by any appropriate technique known in the art. For example, raw nanostructure material can be purified by reflux in a suitable solvent, such as a combination of peroxide ($H_2O_2$) and water, with subsequent rinsing in $CS_2$ and then in methanol, followed by filtration. According to an exemplary technique, approximately 10-100 ml of peroxide is introduced into the medium for every 1-10 mg of CNT in the medium, and the reflux reaction is carried out at a temperature of 20-100° C. See, for example, U.S. Pat. No. 6,553,096 to Zhou et al.

Continuing with FIG. 2A, linker molecule LM, can have at least two functional groups, a matrix-binding functional group 210 and a nanostructure material-binding functional group 220. Matrix-binding functional group 210 can interact or bind (e.g., covalently or non-covalently) with the matrix materials or matrix particles. For example, matrix-binding functional group 210 can react with a group on the surface of the matrix material to form a covalent bond. Nanostructure material-binding functional group 220 can interact with the nanostructure materials, for example CNT. As shown in FIG. 2A, nanostructure material-binding functional group 220 can interact electrostatically with a group on CNT. Accordingly, the linker molecules LM can link matrix particles MP to CNT, or other nanostructure material, through these functional groups.

In some embodiments, the linker molecule comprises an aminosilane molecule. As used herein the term "aminosilane" refers to a molecule having at least one aminoalkyl group and at least one good leaving group, such as an alkoxy, aryloxy, or halo (i.e., Cl, F, I, or Br) group. As used herein the term "aminoalkyl" refers to an alkyl substituent comprising one or more amino functionality. The term "amino" can refer to a primary, secondary, tertiary or quaternary amine. In some embodiments, the aminoalkyl group can have the structure —R—$NH_2$ or —R—$NH_3$+, wherein R is alkylene (i.e., —$(CH_2)_n$—, wherein n is an integer from 1 to 20). In some embodiments, one or more of the $CH_2$ groups of the alkylene chain can be replaced by NH, such that the alkylene group comprises a secondary amino group. In some embodiments the linker molecules can be aminosilane molecules selected from the group consisting of (3-aminopropyl) triethoxysilane (APS), (3-aminopropyl) trimethoxysilane, (3-aminopropyl) methyldiethoxysilane, (3-aminopropyl) methyldimethoxysilane, (N-(2-aminoethyl)-3-aminopropyl) triethoxysilane, (N-(2-aminoethyl)-3-minopropyl) trimethoxysilane, and (N-(2-aminoethyl)-3-aminopropyl) methyldimethoxysilane.

Using FIG. 2A as an example, linker molecule LM can be APS, which comprises alkoxy matrix-binding functional group 210 and nanostructure material-binding functional group 220 consisting of an amine group. Accordingly, APS linker molecule LM can bind to matrix particle MP (e.g., a glass particle) through a chemical reaction between one or more alkoxy matrix-binding functional group 210 and one or more hydroxyl groups on the surface of matrix particle MP, such that the APS linker molecule LM is attached (i.e. linked) to the surface of the matrix particle MP. Nanostructure material-binding functional group 220 can bind to carbon nanotube CNT through an interaction between nanostructure material-binding functional group 220 (i.e., the amino group) and one or more oxygen-containing groups (e.g., a hydroxyl or carboxylic acid) of CNT. For example, as can be appreciated by one of ordinary skill in the art, ionization of the oxygen containing group and protonation of amine 220 can provide a situation comprising electrostatic attraction between a positively charged amine group on the APS linker molecule and a negatively charged oxygen-containing group on the CNT.

Figure 2B:
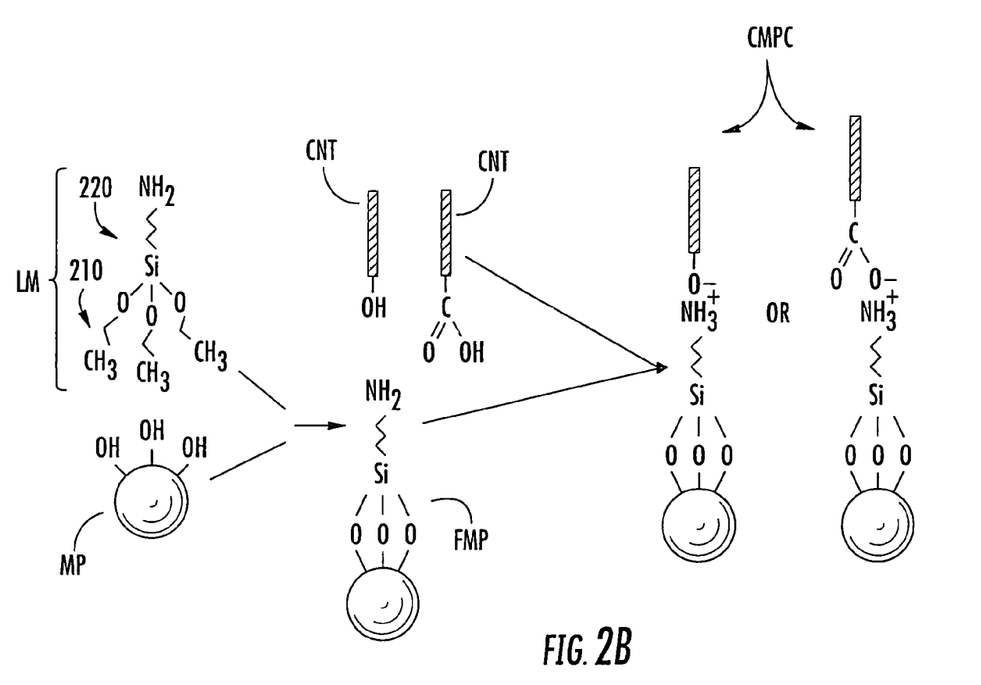
FIG. 2B is a schematic illustration of the formation of CNT-matrix particle complexes by linking CNT to functionalized matrix particles.

FIG. 2B illustrates another exemplary method of preparing CNT-matrix particle complexes by linking matrix particles and CNT. In contrast to the method illustrated in FIG. 2A, this method comprises a first step of forming functionalized matrix particle FMP and then linking FMP to CNT. FMP can be formed by dispersing linker molecule LM and matrix particle MP in a liquid medium. Subsequently, functionalized matrix particle FMP is dispersed with CNT in a liquid medium, wherein functionalized matrix particle FMP binds to CNT to form CNT-matrix particle complex CMPC.

The methods of FIGS. 2A and 2B both result in the formation of CNT-matrix particle complexes and comprise similar components, i.e. matrix particles, linker molecules and CNT. However, rather than simultaneously dispersing the matrix particles and linker molecules with the CNT, as illustrated in FIG. 2A, the method illustrated in FIG. 2B comprises an initial step of binding the linker molecules to the matrix particles, thereby forming functionalized matrix particles. As described above, the linker molecules can bind to the matrix particles through the matrix-binding functional groups on the linker molecules.

The term "functionalized matrix particle" refers to any matrix particle bound to a linker molecule having functional groups capable of binding to nanostructure materials, particularly CNT. In some embodiments a functionalized matrix particle can comprise a glass particle having a plurality of APS linker molecules bound thereto. This functionalized matrix particle can be encapsulated with an APS shell, wherein the APS shell can be positively charged due to the positively charged amine groups of the APS molecule. Such a functionalized matrix particle can consequently bind to CNT through an electrostatic interaction.

The functionalized matrix particles or APS-modified matrix particles can be further processed prior to their dispersion into the liquid medium with CNT. This further processing can include filtering the functionalized matrix particles through a filter membrane to remove the excessive linking molecules (APS). For example, the filter membrane can have a pore size of about 5 µm. After repeated rinsing with an alcohol (e.g., ethanol), the functionalized matrix particles can be exposed to heat, such as in an oven at 120° C. for 3 h. The heating of the functionalized matrix particles cross-links the linking molecule and matrix particle such that the chemical bond is strengthened. For example, in some embodiments, treating a matrix particle comprising hydroxyl groups with an aminosilane linker results in non-covalent association between the linker and the particle or the formation of only a few out of a plurality of possible covalent linkages to form. Heating can catalyze the completion of the condensation reactions between hydroxyl groups on the matrix material and all of the potential leaving groups on the linker molecule. In some embodiments, a single linking molecule is attached to a single matrix particle via a plurality of covalent linkages. In some embodiments, a single linking molecule is attached to more than one matrix particle.

Alternatively, the excessive linking molecules do not need to be removed from the functionalized matrix particle suspension prior to cross-linking.

Figure 3:
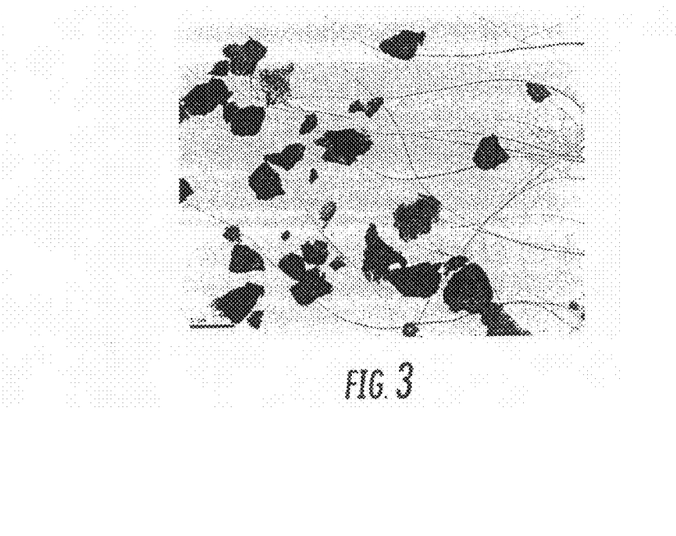
FIG. 3 is a transmission electron microscopy (TEM) image of CNT and matrix particles (glass particles) in a suspension without the inclusion of linker molecules (APS)

FIG. 3 is a transmission electron microscopy (TEM) image of CNT and matrix material (glass particles) in a suspension without the inclusion of linker molecules (APS). This image reveals a mixture of poorly-dispersed CNT bundles and glass particles, with minimal association between the two.

Figure 4:
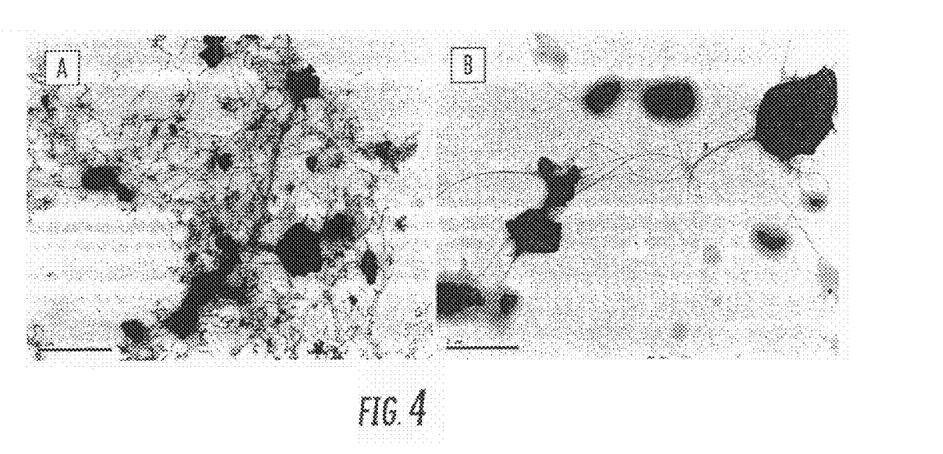
FIGS. 4A and 4B are TEM images of CNT-matrix particle complexes, with the inclusion of APS linker molecules, in a suspension without dispersing agent.
Figure 5:
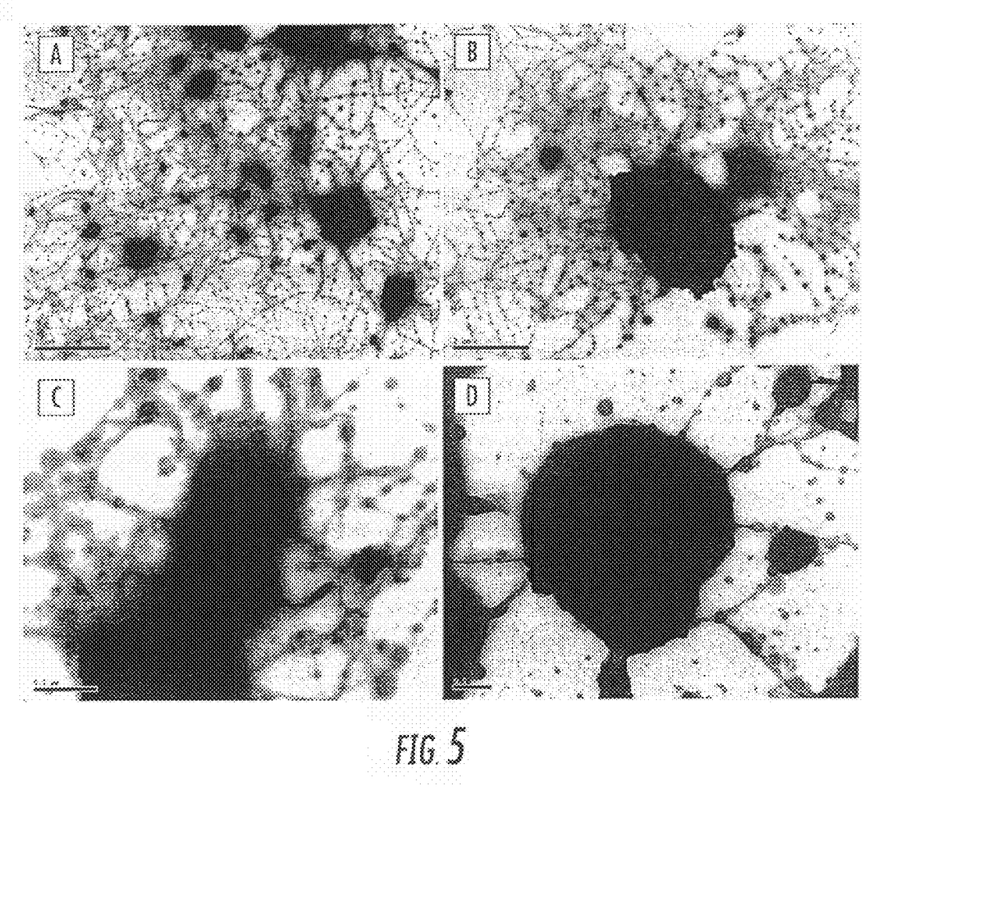
FIGS. 5A and 5B are TEM images of CNT-matrix particle complexes, with the inclusion of APS linker molecules, in a suspension with polyvinyl pyrrolidone (PVP) dispersing agent.
FIGS. 5C and 5D are high magnification TEM images of CNT-matrix particle complexes, with the inclusion of APS linker molecules, in a suspension with polyvinyl pyrrolidone (PVP) dispersing agent.

FIGS. 4A and 4B are TEM images of CNT-matrix particle complexes, formed by the methods described above and illustrated in FIGS. 2A and 2B. FIGS. 4A and 4B show glass particles encapsulated with an APS "shell" having CNT extending therefrom. By including APS linker molecules in the suspension, the CNT and matrix particles in FIGS. 4A and 4B are clearly linked to one another. This is in contrast to FIG. 3, where there appear to be no CNT-matrix particle complexes.

Although any suitable concentration of matrix particles and linker molecules can be added to the liquid medium in the methods described above, a non-limiting example consists of adding APS and glass particles at a ratio of 1:800 (ml/mg) as well as a small amount of water. With the help of sonication for 15 min, a white glass suspension is formed.

An optional step of adding a dispersant to the liquid medium is provided for both methods illustrated in FIGS. 2A and 2B. The dispersant can be selected from the group consisting of polyvinyl pyrrolidone (PVP), polyvinyl butyral (PVB) and ethyl cellulose. The purpose of the dispersant is to minimize agglomeration of CNT and matrix particles such that they are well dispersed within the liquid medium.

FIGS. 5A-5D are TEM images of CNT-matrix particle complexes in suspension with dispersing agent (PVP). The glass particles and CNT appear to be well dispersed without agglomerates of glass particles or CNT. Most of the CNT are uniformly adsorbed on the glass surface. High-magnification TEM images (FIGS. 5C and 5D) reveal star-shaped CNT-matrix particle complexes with CNT protruding from the surface of APS-coated glass particle. When compared to FIGS. 4A and 4B, wherein no dispersant was included in the suspension, the CNT-matrix particle complexes in suspension with PVP shown in FIGS. 5A-5D appear to more evenly dispersed.

For the methods described above, a suitable liquid medium is selected which will permit the formation of a stable suspension of the CNT, matrix particles and linker molecules. The liquid medium can comprise water, an alcohol (e.g., methanol, ethanol, isopropanol, butanol, etc.), dimethylformamide, DMSO, or a combination thereof. In some embodiments, the liquid medium can comprise at least one of water, methanol, ethanol, alcohol, and dimethylformamide (DMF). Upon adding the CNT, matrix particles and linker molecules to the liquid medium, the mixture can optionally be subjected to ultrasonic energy or stirring using, for example, a magnetic stirrer bar, in order to facilitate the formation of a stable suspension. The amount of time that the ultrasonic energy or stirring is applied can vary, but it has been found that approximately two hours at room temperature is sufficient.

As an optional step to the methods described above and illustrated in FIGS. 2A and 2B, CNT may be pre-treated, i.e. prior to the dispersion in liquid medium for the formation of CNT-matrix particle complexes, with acid such that carboxyl groups or other oxygen-containing groups are added to the surface of the CNT thereby imparting a negative charge to the CNT. In accordance with the presently disclosed subject matter, negatively charging the CNT by acid treatment can enhance the electrostatic interaction between the CNT and linker molecules such as APS.

Also optional is a final step of rinsing the CNT-matrix particle complexes. The rinsing step can comprise filtering the CNT-matrix particle complexes through a filter membrane (e.g., with 5 µm pore size) to remove the excessive linker molecules.

In accordance with the presently disclosed subject matter, linking the CNT to matrix particles to produce CNT-matrix particle complexes substantially reduces agglomeration of CNT and matrix particles in the suspension. Further, the formation of CNT-matrix particle complexes strengthens the adhesion between CNT and matrix particles. Therefore, when deposited on a substrate via EPD, CNT in the form of CNT-matrix particle complexes form a substantially more uniform composite film than depositing CNT alone or co-depositing CNT and matrix particles without linker molecules.

Accordingly, methods are also provided for the fabrication of a uniform carbon nanotube composite film by electrophoretically depositing CNT-matrix particle complexes. The method comprises forming CNT-matrix particle complexes, according to the methods described above and illustrated in FIGS. 2A and 2B, and electrophoretically depositing the complexes onto a substrate surface. The EPD process comprises immersing electrodes into the liquid medium, wherein at least one of the electrodes comprises the substrate, and applying an electrical current to the immersed electrodes thereby creating an electrical field therebetween, wherein the CNT-matrix particle complexes migrate toward the substrate and the carbon nanotube-matrix particle complexes bind to the substrate surface. As can be appreciated by one of skill in the art upon review of the present disclosure, the EPD process can comprise any suitable EPD method known in the art. See, for example, U.S. Pat. No. 6,553,096 to Zhou et al, incorporated herein by its entirety.

Figure 6:
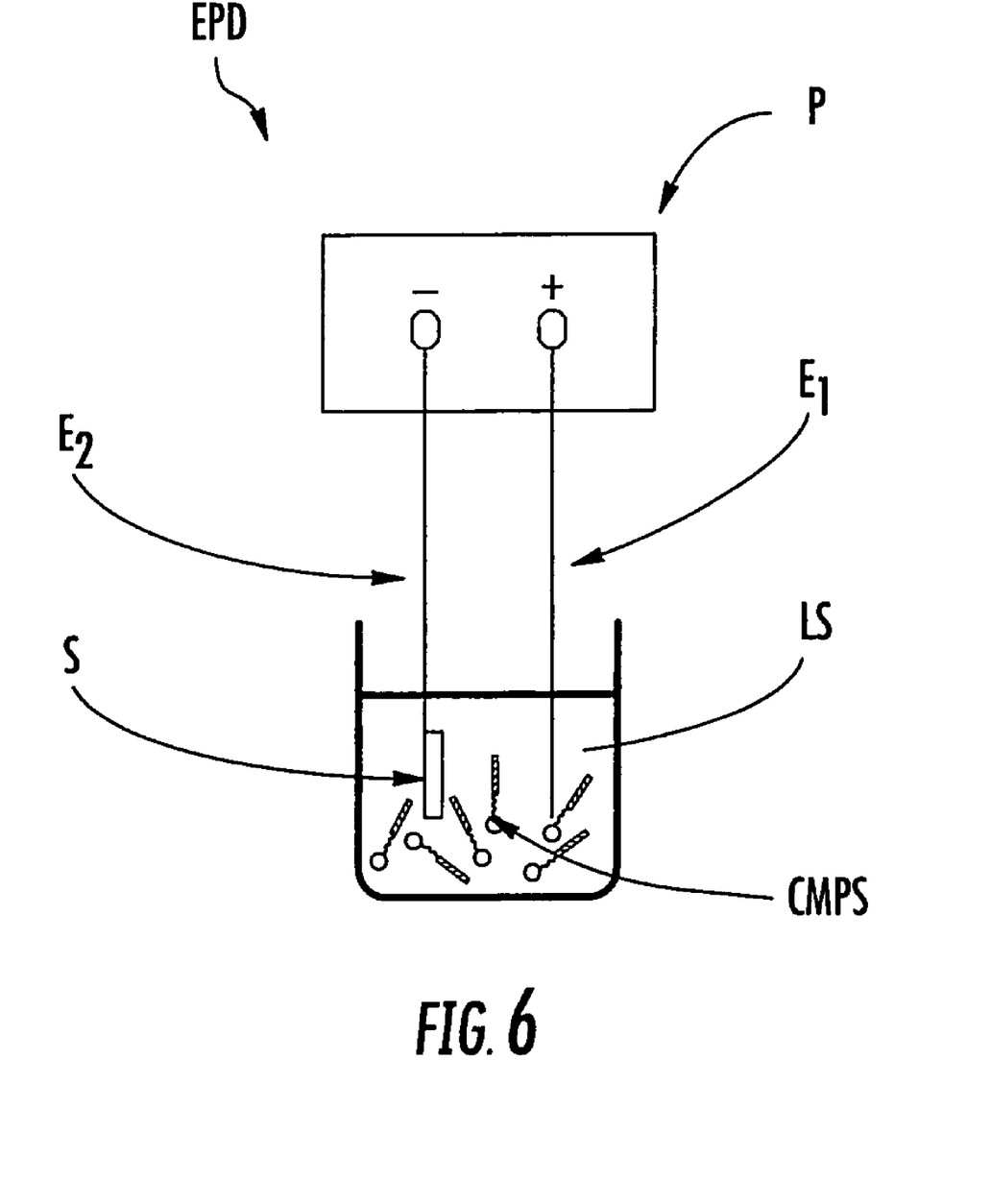
FIG. 6 is a schematic illustration of an electrophoretic deposition process according to the subject matter disclosed herein.

An illustrative EPD technique is shown in FIG. 6. According to the illustrative embodiment, a pair of electrodes, $E_1$ and $E_2$, either of which can comprise substrate S, are introduced into liquid suspension LS containing one or more CNT-matrix particle complex CMPC. Electrodes $E_1$ and $E_2$ are connected to power source P, which produces an electrical field between electrodes $E_1$ and $E_2$, thereby causing CNT-matrix particle complex CMPC to migrate toward and attach to substrate S. In FIG. 6, negative electrode (cathode) $E_2$ comprises substrate S; however, as can be appreciated by one of ordinary skill in the art, substrate S can be attached to or associated with either electrode, so long as CNT-matrix particle complex CMPS is directed thereto during the EPD process.

An optional "charger" can be added to liquid suspension LS in order to facilitate electrophoretic deposition. Chargers can be selected from the group consisting of $MgCl_2$, $Mg(NO_3)_2$, $La(NO_3)_3$, $Y(NO_3)_3$, $AlCl_3$, and sodium hydroxide. Any suitable amount can be utilized. Amounts ranging from less than 1% up to 50%, by weight, as measured relative to the amount of nanostructure-containing material, are feasible.

Any suitable substrate material is within the scope of the presently disclosed subject matter, so long as it possesses the requisite degree of electrical conductivity. Exemplary conductive substrates include, but are not limited to, metal, metal alloy, graphite and doped silicon. Alternatively, the substrate can be formed by a non-conductive material coated with a conductive layer, such as indium-tin oxide glasses, or glass or silicon wafer with a deposited metal layer.

The electrical current applied to the electrodes to produce an electrical field between the electrodes can comprise a direct or alternating current. According to one embodiment, the electrical field applied between the electrodes is 0.1-1000 V/cm, and a direct current of 0.1-200 $mA/cm^2$ is applied for between about 1 second to about 1 hour.

This electrical current causes the CNT-matrix particle complexes in the suspension to migrate toward and attach to the substrate electrode. The particular electrode (i.e.—anode or the cathode) to which the nanostructure material migrates can be controlled through the selection of the charger material. For example, the use of a "negative" charger, such as sodium hydroxide (NaOH) imparts a negative charge to the nanostructure material, thereby creating a tendency for the nanostructure material to migrate towards the positive electrode (cathode). Conversely, when a "positive" charger material is used, such as $MgCl_2$, a positive charge is imparted to the nanostructure material, thereby creating a tendency for the nanostructure material to migrate toward the negative electrode (anode).

An optional step following the EPD process comprises annealing the substrate to form a uniform CNT composite film or layer, wherein the CNT and matrix particles of the CNT-matrix particle complexes are intimately mixed. In one non-limiting example, the coated substrate is removed from the EPD suspension upon completion of the EPD process, dried at room temperature and finally annealed at 700° C. at $5 \times 10^{-7}$ torr vacuum for 12 h. After annealing, a smooth and uniform composite film is formed on the substrate surface with the carbon nanotubes dispersed uniformly in the matrix material.

The composite film or composite layer comprises CNT and a matrix layer, wherein the matrix layer is adhered to the surface of the substrate. The CNT protrude out from the matrix layer with their longitudinal axes substantially perpendicular to the substrate surface and the one end embedded in the matrix. The embedded portion of the CNT is linked to the matrix particles in the matrix layer through the linker molecules.

In one embodiment, the CNT protrude 1 to 10 microns from the substrate surface. Additionally, the protruding CNT are spaced apart with a separation spacing of 0.5 to 10 microns.

If the annealed CNT composite film is to be included in an electron field emission cathode or similar application, the annealed substrate can optionally be subjected to a taping process to activate the CNT tips for effective electron emission. As can be appreciated by one of skill in the art upon review of the present disclosure, the taping process can comprise any suitable taping method known in the art. See, for example, U.S. Pat. No. 6,436,221, incorporated herein in its entirety.

Thus, the above-described EPD process is advantageously well-adapted for high output and automation. This process and similar EPD processes are very versatile and can be used to form uniform coatings of various thicknesses (e.g.—tens of nanometers to a few micrometers thick), to form coatings on complex shapes, and to form complicated structures such as composites and "gated" electrodes. The methods of the presently disclosed subject matter are useful in producing nanostructure materials which have properties that make them beneficial for use in a number of different applications. The methods of the presently disclosed subject matter are especially beneficial in producing nanostructure materials for incorporation into electron field emission cathodes for devices such as x-ray generating devices, gas discharge tubes, lighting devices, microwave power amplifiers, ion guns, electron beam lithography devices, high energy accelerators, free electron lasers, electron microscopes and microprobes, and flat panel displays.

As previously discussed, FIG. 1 illustrates a CNT electron field emission cathode (i.e., EFEC) produced by the methods of the presently disclosed subject matter. The CNT electron field emission cathode comprises composite layer CL, produced by the EPD of one or more CNT-matrix particle complex CMPC, adhered to substrate S. More particularity, composite layer CL comprises matrix layer ML, a region comprising matrix particles adhered to the surface of substrate. Protruding from and embedded in matrix layer ML are one or more carbon nanotube CNT. As shown in the expanded view of CNT-matrix particle complex CMPC, carbon nanotube CNT is attached to matrix particles via linker molecule LM.

Figure 7:
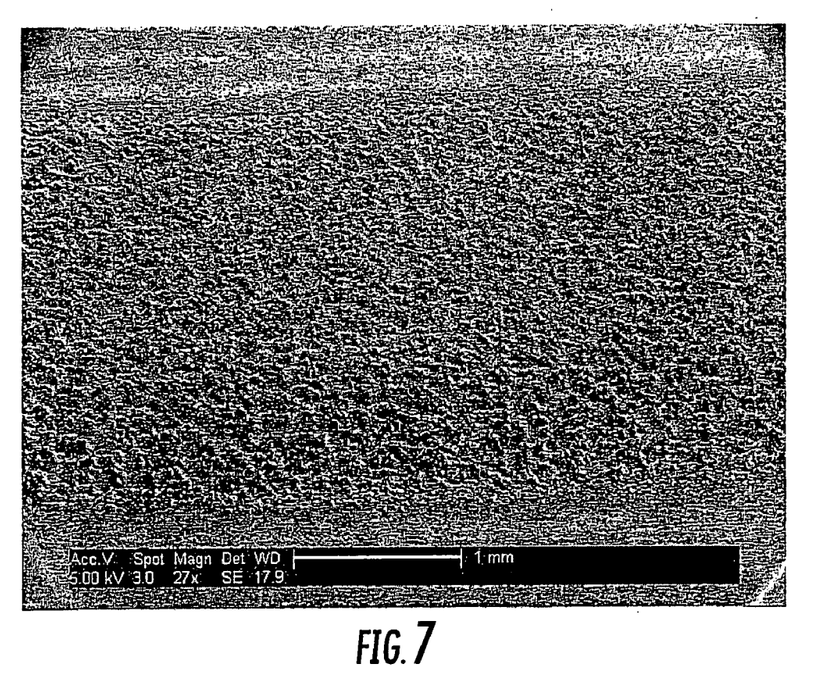
FIG. 7 is a scanning electron microscope (SEM) image of the morphology of a CNT composite film from the electrophoretic co-deposition of CNT and matrix material without the inclusion of APS linker molecules.
Figure 8:
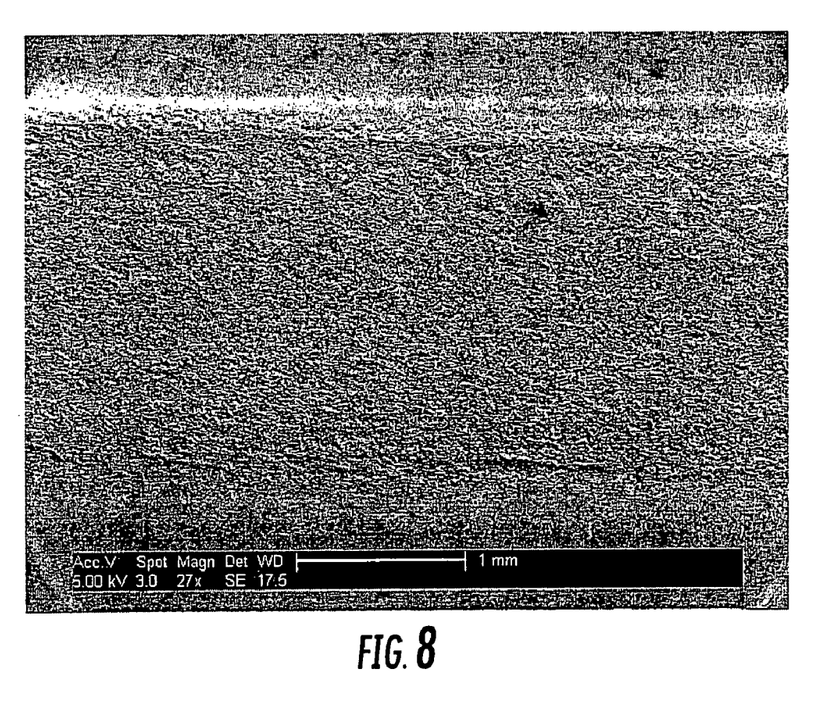
FIG. 8 is a SEM image of the morphology of a CNT composite film from the electrophoretic deposition of CNT-matrix particle complexes made with APS linker molecules.
Figure 9:
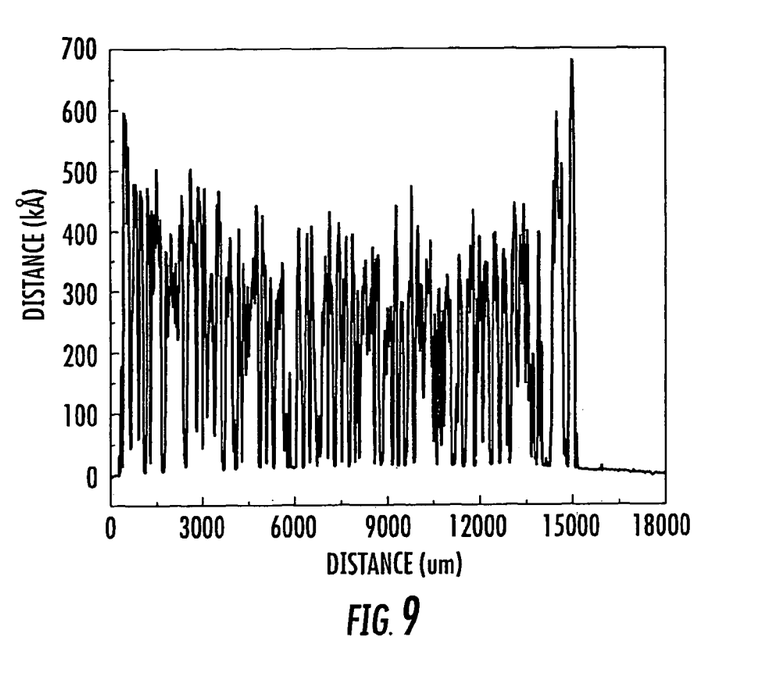
FIG. 9 is a graphical representation of the surface topography of the CNT composite film of FIG. 7.
Figure 10:
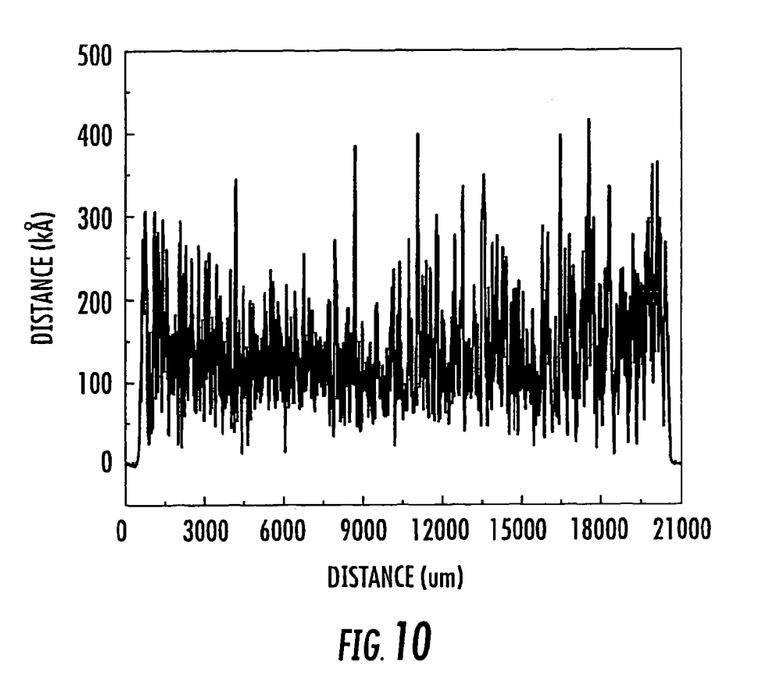
FIG. 10 is a graphical representation of the surface topography of the CNT composite film of FIG. 8.

FIGS. 7 and 8 are SEM images of composite films deposited onto substrates, fabricated by the methods described above. FIG. 7 is a SEM image of the morphology of a "regular" CNT composite film formed by the electrophoretic co-deposition of CNT and glass particles in suspension without linker molecules. FIG. 8 is a SEM image of the morphology of a CNT composite film formed by the electrophoretic deposition of CNT-matrix particle complexes in suspension. Compared to the SEM image of the regular composite film morphology (FIG. 7), the composite film deposited from the CNT-matrix particle complexes (FIG. 8) has a smoother and more homogeneous surface. The topography results for the composite films shown in FIGS. 7 and 8 are shown in FIGS. 9 and 10, respectively. The topographical data indicate that the fluctuation of the film thickness of the CNT-matrix particle complex composite film (FIG. 10) is substantially smaller than the fluctuation of the film thickness of the regular CNT composite film (FIG. 9). Particularly, the topographical variation in the surface of the films is approximately 300 kÅ less in the CNT-matrix particle complex composite film than the regular CNT composite film.

Accordingly, the formation of CNT-matrix particle complexes prior to electrophoretic deposition provides for a suspension of well-dispersed CNT strongly adhered to matrix particles. Therefore, when deposited on a substrate via EPD, the CNT-matrix particle complexes provide for the homogenous deposition of CNT and matrix particles to form a composite film with improved uniformity, stronger adhesion and reduced cracking. The field emission properties from a homogeneous CNT composite film produced by the methods of the presently disclosed subject matter are greatly improved in emission uniformity and current density. Further, electron field emission cathodes produced by the methods of the presently disclosed subject matter have enhanced field emission properties, particularly improved emission uniformity and current density.

EXAMPLES

The following examples have been included to illustrate representative and exemplary modes of the presently disclosed subject matter. In light of the present disclosure and the general level of skill in the art, those of skill will appreciate that the following examples are intended to be exemplary only and that numerous changes, modifications, and alterations can be employed without departing from the spirit and scope of the presently disclosed subject matter.

Example 1

Preparation of Functionalized Matrix Particles

Commercially available glass particles were processed via planetary ball milling to produce glass particles with a diameter of 300 nm~3 μm. The ball-milled glass particles were dispersed in a liquid medium comprising ethanol and a small amount of water. The liquid medium further contained 3-aminopropyl)triethoxysilane (APS) linker molecules at a ratio of APS to glass of 1:800 (ml/mg). The liquid medium containing the APS linker molecules and matrix particles was sonicated for 15 min, whereby a white glass suspension formed. Although not a required step, the suspension is filtered through a filter membrane (5 μm) to remove the excessive APS. After repeated rinsing with ethanol, the functionalized matrix particles, i.e. the APS-modified glass particles, were dried in an oven at 120° C. for 3 hours to cross-link the adsorbed APS to the glass.

Example 2

Preparation of CNT-Matrix Particle Complexes

Pre-formed CNT were prepared by chemical vapor deposition followed by an acid treatment to remove the catalyst. The acid treatment can also introduce some oxygen-containing groups onto the CNT. The CNT were then dispersed in a liquid medium comprising ethanol, polyvinyl pyrrolidone (PVP) as a dispersing agent, and $MgCl_2$ as a charger. The CNT were included at 0.05 g/L and the PVP at 0.1 g/L. The suspension was sonicated for 30 min to ensure that the CNT were well dispersed and possible agglomerates were separated. The functionalized matrix particles were then added to the suspension, followed by another 30 minute sonication to form a stable suspension. The functionalized matrix particles were added to the suspension at 400 wt % of the total CNT. Electrostatic attraction between the CNT and functionalized matrix particles resulted in the formation of CNT-matrix particle complexes, as illustrated in FIGS. 5A-5D. This method of preparing CNT-matrix particle complexes is illustrated in FIG. 2B. Alternatively, as previously described and illustrated in FIG. 2A, the matrix particles, linker molecules and CNT can optionally be dispersed in a liquid medium simultaneously to yield CNT-matrix particle complexes.

Example 3

Electrophoretic Deposition of a Uniform CNT Composite Film and Fabrication of an Electron Field Emission Cathode Electrophoretic deposition was carried out at room temperature under constant DC voltage (20 V). Stainless steel electrodes, one of which comprised the substrate, were used with an electrode separation of 1 cm. As an optional first step, the stainless steel substrate was immersed into a binder solution containing glass particles and CNT for 25 seconds. Then, CNT-matrix particle complexes were electrophoretically deposited onto the substrate electrode by immersing both the substrate electrode and counter electrode into a suspension of CNT-matrix particle complexes for 25 sec under the applied electrical current. The CNT-matrix particle complex coated substrate was then removed from the EPD suspension, dried at room temperature, and annealed at 700° C. at $5 \times 10^{-7}$ torr vacuum for 12 hours. FIG. 8 shows the resulting CNT composite film. As applied to field emission applications, the annealed substrate can optionally be subjected to a taping process to activate the CNT tips as effective emitters. As can be appreciated by one of skill in the art upon review of the present disclosure, the taping process can comprise any suitable taping method known in the art. See, for example, U.S. Pat. No. 6,436,221, incorporated herein in its entirety.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method of preparing a carbon nanotube-matrix particle complex, comprising:
   providing at least one carbon nanotube;
   providing at least one matrix particle;
   providing at least one linker molecule having at least two functional groups; and
   dispersing the at least one carbon nanotube, the at least one matrix particle, and the at least one linker molecule together simultaneously in a liquid medium to form a stable suspension thereof, wherein the liquid medium is selected from water, methanol, ethanol, isopropanol, butanol, dimethylformamide (DMF), dimethyl sulfoxide (DMSO) or a combination thereof, and wherein a first functional group of the at least one linker molecule binds to a surface of the at least one matrix particle thereby forming a coated surface, and a second functional group of the at least one linker molecule binds to the at least one carbon nanotube to thereby form a carbon nanotube-matrix particle complex.

2. A method of preparing a carbon nanotube-matrix particle complex comprising a matrix particle with a carbon nanotube linked to and protruding from a coated surface of said matrix particle, the method comprising:
   providing at least one carbon nanotube;
   providing at least one matrix particle;
   providing at least one linker molecule; and
   dispersing the at least one carbon nanotube, the at least one matrix particle, and the at least one linker molecule together simultaneously in a liquid medium to form a stable suspension thereof, wherein a first functional group of the at least one linker molecule binds to the surface of the at least one matrix particle thereby forming the coated surface, and a second functional group binds to the at least one carbon nanotube such that a carbon nanotube-matrix particle complex is formed wherein the carbon nanotube protrudes from the coated surface of the matrix particle.

3. The method of claim 1, wherein the matrix particle is a glass particle.

4. The method of claim 3, wherein the glass particle has a diameter of 300 nm to 3 µm.

5. The method of claim 1, wherein the linker molecule is an aminosilane molecule.

6. The method of claim 5, wherein the aminosilane molecule is selected from the group consisting of (3-aminopropyl) triethoxysilane (APS), (3-aminopropyl) trimethoxysilane, (3-aminopropyl)methyldiethoxysilane, (3-aminopropyl)methyldimethoxysilane, (2-aminoethyl-3-aminopropyl) triethoxysilane, (2-aminoethyl-3-aminopropyl) trimethoxysilane, and (2-aminoethyl-3-aminopropyl) methyldimethoxysilane.

7. The method of claim 5, wherein the binding of the first functional group of the aminosilane molecule to the surface of the matrix particle is through a chemical reaction between one or more alkoxy groups of the aminosilane molecule and one or more hydroxyl groups of the matrix particle.

8. The method of claim 7, wherein the matrix particle is a glass particle.

9. The method of claim 5, wherein the binding of the second functional group of the aminosilane molecule to the carbon nanotube is through an electrostatic interaction between an amino group of the aminosilane molecule and one or more oxygen-containing groups of the carbon nanotube.

10. The method of claim 1, further comprising adding dispersant to the liquid medium, wherein the dispersant is selected from the group consisting of polyvinyl pyrrolidone (PVP), polyvinyl butyral (PVB) and ethyl cellulose.

11. The method of claim 1, further comprising treating the at least one carbon nanotube with acid to impart a negative charge to the at least one carbon nanotube prior to dispersion into the liquid medium.

12. A carbon nanotube-matrix particle complex made from the method of claim 1.

13. A method of preparing a carbon nanotube-matrix particle complex, comprising:
   providing at least one carbon nanotube;
   providing at least one matrix particle;
   providing at least one linker molecule dispersing the at least one linker molecule and the at least one matrix particle in an alcohol solution wherein the linker molecule binds to a surface of the matrix particle thereby initially forming a functionalized matrix, particle, and wherein the alcohol comprises an alcohol selected from the group consisting of methanol, ethanol, isopropanol, and butanol; and
   subsequently dispersing the at least one functionalized matrix particle in a liquid medium with at least one carbon nanotube to form a stable suspension thereof, wherein the liquid medium is selected from water, methanol, ethanol, isopropanol, butanol, dimethylformamide (DMF), dimethyl sulfoxide (DMSO) or a combination thereof, and wherein the at least one functionalized matrix particle binds to the at least one carbon nanotube to form a carbon nanotube-matrix particle complex.

14. The method of claim 13, further comprising sonicating or stirring the alcohol solution comprising the at least one linker molecule and the at least one matrix particle to form the at least one functionalized matrix particle.

15. The method of claim 13, further comprising cross-linking the at least one functionalized matrix particle by applying heat.

16. The method of claim 13, wherein the at least one matrix particle is a glass particle.

17. The method of claim 16, wherein the glass particle has a diameter of 300 nm to 3 μm.

18. The method of claim 13, wherein the at least one linker molecule is an aminosilane molecule.

19. The method of claim 18, wherein the aminosilane molecule is selected from the group consisting of (3-aminopropyl) triethoxysilane (APS), (3-aminopropyl) trimethoxysilane, (3-aminopropyl)methyldiethoxysilane, (3-aminopropyl)methyldimethoxysilane, (2-aminoethyl-3-aminopropyl) triethoxysilane, (2-aminoethyl-3-aminopropyl) trimethoxysilane, and (2-aminoethyl-3-aminopropyl) methyldimethoxysilane.

20. The method of claim 18, wherein the binding of the first functional group of the aminosilane molecule to the surface of the at least one matrix particle is through a chemical reaction between one or more alkoxy groups of the aminosiloxane molecule and one or more hydroxyl groups of the matrix particle.

21. The method of claim 20, wherein the at least one matrix particle is a glass particle.

22. The method of claim 18, wherein the binding of the second functional group of the aminosilane molecule to the at least one carbon nanotube is through an electrostatic interaction between an amino group of the aminosiloxane molecule and one or more oxygen-containing groups of the carbon nanotube.

23. The method of claim 13, further comprising adding dispersant to the liquid medium, wherein the dispersant is selected from the group consisting of polyvinyl pyrrolidone (PVP), polyvinyl butyral (PVB) and ethyl cellulose.

24. The method of claim 13, further comprising treating the carbon nanotubes with acid to impart a negative charge to the at least one carbon nanotube prior to dispersion into the liquid medium.

25. A carbon nanotube-matrix particle complex made from the method of claim 13.

26. The method of claim 1, wherein the linker molecule and the matrix particle are dispersed in the liquid medium at a ratio of 1:800 mL/mg.

27. The method of claim 1, further comprising dispersing the carbon nanotube-matrix particle complex in a suspension wherein agglomeration is substantially reduced in comparison to agglomeration in a suspension of carbon nanotubes and matrix particles.

28. The method of claim 1, further comprising adding carboxyl or other oxygen-containing groups to the surface of the carbon nanotube prior to dispersion in the liquid medium.

29. The method of claim 13, wherein the linker molecule and the matrix particle are dispersed in the alcohol solution at a ratio of 1:800 mL/mg.

30. The method of claim 13, wherein the functionalized matrix particle is dispersed in the liquid medium at 400 wt % of total carbon nanotubes.

31. The method of claim 13, further comprising dispersing the carbon nanotube-matrix particle complex in a suspension wherein agglomeration is substantially reduced in comparison to agglomeration in a suspension of carbon nanotubes and matrix particles.

32. The method of claim 13, further comprising adding carboxyl or other oxygen-containing groups to the surface of the carbon nanotube prior to dispersion into the liquid medium.

33. A method of preparing a carbon nanotube-matrix particle complex, comprising:
   providing at least one carbon nanotube;
   providing at least one matrix particle having a diameter of 300 nm to 3 μm;
   providing at least one linker molecule having at least two functional groups; and
   dispersing the at least one carbon nanotube, the at least one matrix particle, and the at least one linker molecule in a liquid medium to form a stable suspension thereof, wherein a first functional group of the at least one linker molecule binds to a surface of the at least one matrix particle thereby forming a coated surface, and a second functional group of the at least one linker molecule binds to the at least one carbon nanotube to thereby form a carbon nanotube-matrix particle complex.

34. The method according to claim 33, wherein the at least one carbon nanotube links to and protrudes from the coated surface of the at least one matrix particle.

35. The method according to claim 34, wherein the matrix particle is a glass particle.

36. The method according to claim 33, further comprising sonicating or stirring the suspension comprising the at least one carbon nanotube, the at least one linker molecule and the at least one matrix particle.

37. The method according to claim 1, wherein the at least one carbon nanotube links to and protrudes from the coated surface of the at least one matrix particle.

* * * * *